Aug. 11, 1964     A. J. SOBEY     3,143,853
SOLID PROPELLANT BURN AREA CONTROL
Filed Dec. 28, 1961
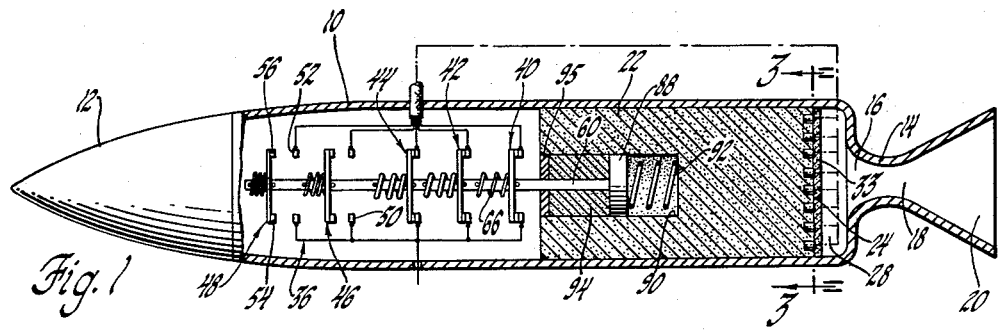
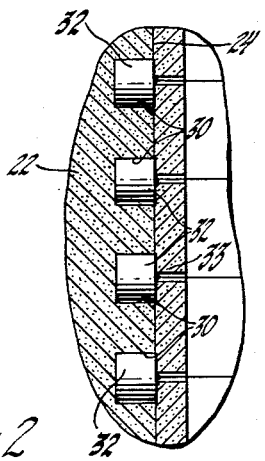
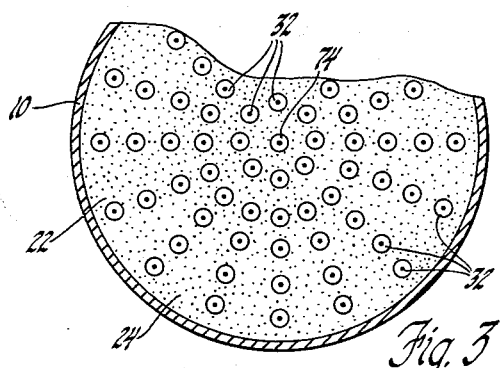
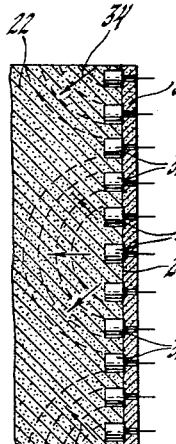
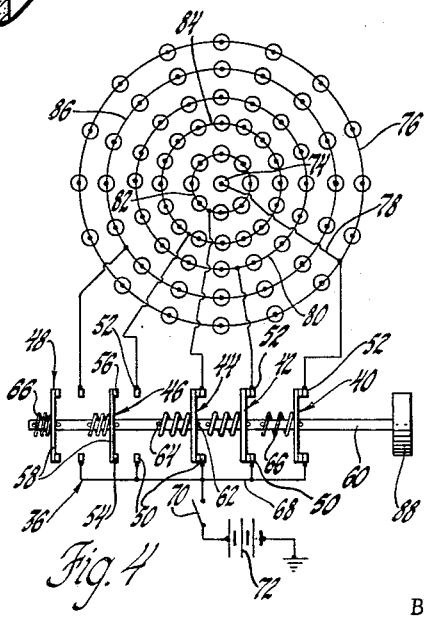
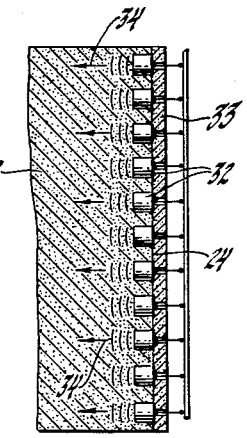
INVENTOR.
Albert J. Sobey
BY
*Robert E. McCollum*
ATTORNEY

United States Patent Office 3,143,853
Patented Aug. 11, 1964

3,143,853
SOLID PROPELLANT BURN AREA CONTROL
Albert J. Sobey, Indianapolis, Ind., assignor to General Motors Corporation, Detroit, Mich., a corporation of Delaware
Filed Dec. 28, 1961, Ser. No. 162,750
7 Claims. (Cl. 60—35.6)

This invention relates to a solid propellant rocket motor providing a specified thrust at light off regardless of the propellant burn rate and ambient temperature conditions under which the rocket motor is stored.

Solid propellant rocket motors have been used quite extensively in recent years as missiles in warfare. Many missiles of this type operate without any particular control systems, depending solely upon the selection of the quantity and burn rate of the propellant, the nozzle throat size, and controlled launching conditions for proper functioning. For such use, however, they must be able to operate satisfactorily and in the same manner over extreme variations of ambient temperature. Propellant ambient temperature, however, controls its initial burn rate, which controls the volume of gas generated at ignition for a given burn area. Therefore, most solid propellant missiles obtain their design thrust at light off only if the propellant temperature is within a certain range. Missiles that are stored in locations where the ambient temperature is off-design, therefore provide either too little thrust at firing or generate an excess of gas effecting an explosion of the missile.

In the past, this difficulty has been overcome to some degree by varying the throat area of the missile exhaust nozzle in accordance with changes in propellant temperature to raise or lower the combustion chamber gas pressure to the proper level. However, this generally involves the use of mechanical or other means inserted in the combustion chamber and/or in the nozzle, which interferes with the exhaust stream and impairs engine operating efficiency.

This invention conditions the missile for design operation at all times prior to firing even though ambient temperature conditions change by varying the initial area of the propellant to be burned in proportion to the change in propellant temperature and burn rate. Thus, the volume of gas generated at light off will always be constant. More specifically, the invention provides a solid propellant grain having a large number of igniter squibs scattered sporadically over its initial burn surface. A control contained in the grain sensitive to grain temperature changes selectively conditions different groups of squibs for ignition to increase or decrease the initial burn area in inverse proportion to the change in grain temperature and burn rate. At firing, therefore, a specific combustion chamber pressure is obtained producing a specific thrust level.

Therefore, it is an object of the invention to construct a solid propellant rocket motor in a manner to always obtain a specific thrust level upon firing.

It is a further object of the invention to construct a solid propellant rocket motor with means to compensate for propellant temperature changes and burn rate prior to firing to always provide a constant combustion chamber pressure upon ignition of the propellant.

It is a still further object of the invention to provide a solid propellant rocket motor construction having means varying the initial burn area of the propellant in inverse proportion to changes in the propellant burn rate prior to firing to provide a constant combustion chamber pressure at light off.

Other objects, features and advantages of the invention will become apparent upon reference to the succeeding detailed description of the invention and to the drawings illustrating the preferred embodiments thereof, wherein:

FIGURE 1 is a side elevational view of a rocket motor embodying the invention, with parts broken away and in section;

FIGURE 2 is an enlarged view of a portion of a detail of FIGURE 1;

FIGURE 3 is an enlarged cross-sectional view with parts broken away taken on a plane indicated by and viewed in the direction of the arrows 3—3 of FIGURE 1;

FIGURE 4 is a schematic layout of the electrical connections of the invention; and FIGURES 5 and 6 are enlarged views of a detail of FIGURE 1 illustrating the invention under different operating conditions.

The figures illustrate the invention in connection with a rocket motor. It will be clear, however, that it would have uses in many installations other than that to be described without departing from the scope of the invention.

FIGURE 1 shows a rocket motor 1 having a hollow longitudinally extending annular casing 10 closed at one end by a cap 12 and formed at its opposite end into an exhaust nozzle 14. The nozzle is a known nonvectoring type having a conical converging inlet 16, a fixed area throat 18 and a conical diverging outlet 20. Casing 10 encloses a cylindrical composite solid propellant charge or grain 22 of a known end burning type consisting essentially of a mixture of a fuel and oxidizer. The grain has an end face 24 constituting its initial burn surface, and is spaced axially from the nozzle inlet 16 to define a combustion chamber 28. The gas evolved by the chemical reaction of the fuel and oxidizer fills and pressurizes chamber 28, and is compressed, accelerated and expanded by the nozzle in a known manner. Further details of the rocket motor per se will not be given since they are known and are immaterial to an understanding of the invention.

The grain 22 may comprise a heterogeneous mixture of oxidizing crystals of perchlorate, for example, in a matrix of an organic plastic-like fuel such as asphalt, or other mixtures could be used. It would also include additives to reduce the brittleness and explosiveness, while promoting burning. The grain 22 burns in a direction perpendicular to its face, and initially at a smooth rate varying as a function of its temperature. Burning may be initiated by any well known pyrotechnic igniter. In this instance, the burn surface 24 is provided with a large number of bores 30 in which are inserted explosive squibs 32. The surface 24 is coated with a low melting point inhibitor 33 to permit ignition of individual squibs. The inhibitor delays the setting off of the remaining squibs by the heat of the gases in the combustion chamber after firing of the missile until the propellant between squibs has burned. That portion of the inhibitor covering the particular squibs ignited would be burned out at ignition providing a hole in the inhibitor at that point. While FIGURE 3 shows the squibs as being symmetrically arranged, it will be clear that they could be sporadically scattered around the surface 24 without departing from the scope of the invention as long as a large number is used. The squibs are preferably ignited electrically in a manner to be described, although it will be clear that they could be ignited otherwise.

As stated previously, the volume of gas generated upon burning of the grain is directly proportional to the grain burn area and its grain burn rate. Prior to firing, the burn rate is controlled by the grain ambient temperature which may change with changes in storage locations of the missile. Therefore, to assure that the proper quantity of gas will be generated in the combustion chamber at light off to produce the design thrust, the burn area should vary in inverse proportion to the change in grain temperature.

In the present instance, if all the squibs were ignited at firing, the entire surface area of face 24 would burn in the manner shown in FIGURE 5. Since the grain burns at right angles to the walls and ends of each of the bores, as well as to face 24, the grain between the bores would be immediately consumed, and burning would continue uniformly over the entire surface in an axial direction, as shown by the arrows 34. The grain therefore would be progressively consumed over an area which can be considered as a minimum for an efficient performance program, and is limited by the diameter of the grain.

However, by igniting only certain of the squibs, burning would take place locally in the manner shown in FIGURE 6, and the burning would spread out in an arcuate pattern from the bore rather than straight as seen in FIGURE 5. Progressively larger areas of the grain would therefore be consumed. Therefore, it will be seen that if the burn rate is lowered by lowered ambient temperature condition, the face 24 should be ignited at scattered local areas instead of over the entire surface so that the burning area is increased in proportion to the slowing down of the propellant burn rate. Conversely, if the burn rate increases, more squibs should be ignited so that burning over a lesser total area occurs.

To accomplish this, a master control unit, indicated schematically at 36, is provided that automatically conditions the grain for burning over a larger or smaller area in response to grain temperature changes by preselecting certain ones of the squibs 32 to be ignited each time the burn rate changes. Thus, a constant volume of gas will be generated and the same combustion chamber gas pressure will always be provided upon ignition of the grain regardless of the grain temperature or burn rate.

For clarity, the control unit 36 is illustrated only schematically in FIGURES 1 and 4, and it will be clear that the actual construction would occupy only a small fraction of the space shown, the remaining space being filled with solid propellant essentially up to the missile nose cone or cap 12. Unit 36 consists, in general, of a gang-switch having five contact type switches 40, 42, 44, 46 and 48, progressively opened or closed in response to grain temperature changes. More specifically, each switch has two fixed contacts 50 and 52, and two movable contacts 54 and 56 mounted on a connecting bar 58. Each bar 58 is slidably mounted on a movable rod 60 between two stops 62 and 64, and is normally pressed against stop 62 by a spring 66.

Each of the fixed contacts 50 is connected to a common bus bar 68, which in turn is connected through an on-off missile ignition switch 70 to a battery or other suitable electrical power source 72.

Each of the fixed contacts 52 is connected to a different selected group of igniter squibs 32 so that upon closure of any of the switches and switch 70, the squibs in that group or groups will be ignited. More specifically, the center squib 74 and all the squibs 32 in the outer ring ring 76 are interconnected by wiring 78 to the fixed contact 52 of switch 40. Similarly, the squibs in rings 80, 82, 84 and 86 are each connected by the wiring shown to the contacts 52 of the respective switches 42, 44, 46 and 48 so that different areas of the burn surface 24 will be conditioned for ignition each time one of the switches is closed.

The bars 58 containing the switch contacts 54 and 56 are arranged on the rod 60 so that each switch along the line is progressively a greater distance from its fixed contacts 50 and 52 than the previous switch. The switches are therefore progressively and cumulatively closed one after the other upon movement of the rod to the right as seen in FIGURE 4 to progressively increase the number of squibs conditioned for ignition so that burning will take place over a progressively lesser area of the grain.

FIGURES 5 and 6 show respectively, the grain burning over the smallest and largest total areas. The gang switch would intially be assembled so that a burn area between the two extremes would be established. Thus, initially, switches 40, 42 and 44 would be closed so that movement of rod 60 in either direction would change the number of squibs to be conditioned for ignition to change the total burn area. Rod 60 is secured at one end to a piston 88 slidably contained within a bore 90 in the propellant grain 22. A compression spring 92 biases the piston and rod in one direction against a temperature sensitive member 94. Member 94 loosely surrounds the rod and seat against a cap 95 secured to the grain by any suitable means not shown.

Member 94 may consist of a block of paraffin, for example, or any other known material adapted to expand or contract in response to grain temperature changes from its design point. The rocket motor is initially assembled under propellant design ambient temperature conditions so as to fix the grain initial burn rate. Therefore, the material of which member 94 is made would be chosen so that at assembly, it would have an ambient temperature corresponding to the grain design temperature. Thus, the piston 88 would be in its medium position as shown, with switches 40, 42 and 44 closed conditionnig squib 74 and the squibs in rings 76, 80 and 82 for ignition.

The grain 22 would then be inserted in the casing 10 through its cap end, and the cap 12 secured to the casing by suitable means not shown. If the grain were ignited at this time by closing switch 72, then the squibs conditioned for ignition by switches 40, 42 and 44 would be ignited, the inhibitor 33 burned through at those points, the grain would burn over its design area, and the reaction of the fuel and oxidizer would produce the design gas pressure in chamber 28. The gases would then be discharged from the nozzle imparting the desired thrust to the rocket motor to launch it in a satisfactory manner.

If the missile were moved to a location where the grain ambient temperature were lower than design, then as the temperature dropped, the grain burn rate would also drop. Simultaneously, however, member 94 would contract permitting spring 92 to move piston 88 and rod 60 to the left (FIGURE 1) to open one or more of the switches 44, 42 and 40. Thus, less squibs would be conditioned for ignition, and the burn surface area would increase in proportion to the lowered burn rate so that the same volume of gas would be generated upon ignition of the grain as under the prior operation. Conversely, if the grain ambient temperature were higher than design, then rod 60 would be moved to the right to close one or more switches thereby conditioning more squibs for ignition. The total initial burn area would therefore decrease in proportion to the increased burn rate so that the volume of gas generated upon ignition would be the same as before. Once the grain has been ignited, it burns initially over the area fixed in accordance with the grain temperature, and is regressively consumed.

Therefore, it will be seen that the rocket missiles may be stored in any location regardless of the temperature conditions since, at firing, the combustion chamber gas pressure providing the design thrust is always obtained.

While the grain has been illustrated as being cylindrical in shape, it will be clear that other grain shapes could be used, and that other types of nozzles, such as swivel or vectoring nozzles, for example, could be used without departing from the scope of the invention. Also, while the invention has been illustrated in connection with a missile type rocket motor, it will be clear to those skilled in the art to which the invention pertains that it would have uses in many installations other than that illustrated, and that many changes and modifications may be made thereto without departing from the scope of the invention.

I claim:

1. A solid propellant reaction motor comprising a hollow casing formed with a fluid jet exhaust nozzle at one end and containing a solid propellant grain spaced from said nozzle to define a combustion chamber between, said grain burning regressively from its surface exposed to the combustion chamber generating a gas under pressure in said chamber, and control means to maintain constant the volume of gas to be generated upon ignition of said surface, said control means including means connected to said grain surface and movable to different positions conditioning different total areas of said grain surface for burning.

2. A solid propellant reaction motor comprising a hollow casing formed with a fluid jet exhaust nozzle at one end and containing a solid propellant grain spaced from said nozzle to define a combustion chamber between, said grain burning regressively from its surface exposed to the combustion chamber generating a gas under pressure in said chamber, and control means to maintain constant the volume of gas to be generated upon ignition of said surface, said control means including means operably connected to said grain surface and movable to different positions in response to changes in grain ambient temperature conditioning different total areas of said grain surface for burning.

3. A solid propellant reaction motor comprising a hollow casing formed with a fluid jet exhaust nozzle at one end and containing a solid propellant grain spaced from said nozzle to define a combustion chamber between, said grain burning regressively from its surface exposed to the combustion chamber generating a gas under pressure in said chamber, and control means to maintain constant the volume of gas to be generated upon ignition of said surface, said control means including means operably connected to said grain surface and movable to different positions conditioning different total areas of said grain surface for burning, the movement of said movable means from one of said positions to another of said positions conditioning only one total surface area for ignition at one time.

4. A solid propellant reaction motor comprising a hollow casing formed with a fluid jet exhaust nozzle at one end and containing a solid propellant grain spaced from said nozzle to define a combustion chamber between, said grain burning regressively from its surface exposed to the combustion chamber generating a gas under pressure in said chamber, said grain surface having a plurality of grain igniter means therein, and control means to maintain constant the volume of gas to be generated upon ignition of said surface by controlling the burn area to be ignited, said control means including means connected to said igniter means and movable to different positions variably conditioning for operation a different group of said igniter means in each of said positions.

5. A solid propellant reaction motor comprising a hollow casing formed with a fluid jet exhaust nozzle at one end and containing a solid propellant grain spaced from said nozzle to define a combustion chamber between, said grain burning regressively from its surface exposed to the combustion chamber and in a direction perpendicular to the burn surface producing a gas under pressure in said chamber, the initial burn rate of said grain and the chamber pressure varying with changes in grain ambient temperature, and burn rate control means to compensate for changes in grain temperature to produce a predetermined chamber pressure upon initial burning of said grain, said grain burn surface containing a plurality of separated igniter means, said control means comprising movable grain ambient temperature responsive means having one position conditioning a selected group of said igniter means for operation to burn a predetermined total area of said grain surface upon ignition of said selected igniter means and movable to another position in response to a change in grain ambient temperature to condition a different selected group of said igniter means for operation to burn a different total area of said burn surface upon ignition of said different selected group of said igniter means.

6. A solid propellant reaction motor comprising a hollow casing formed with a fluid jet exhaust nozzle at one end and containing a solid propellant grain spaced from said nozzle to define a combustion chamber between, said grain burning regressively from its surface exposed to the combustion chamber and in a direction perpendicular to the burn surface producing a gas under pressure in said chamber, the initial burn rate of said grain and the chamber pressure varying with changes in grain ambient temperature, and burn area control means to compensate for changes in grain ambient temperature to produce a predetermined chamber gas pressure upon burning of said grain, said grain having a plurality of bores extending partially into said grain from said surface, and igniter means in each of said bores, said control means including means connected to said igniter means and movable to a plurality of positions in response to grain ambient temperature changes, said movable means in each position conditioning a different collective group of said igniter means for operation so that the burn surface area of said grain to be ignited changes in proportion to a change in the grain temperature to maintain the volume of gas to be generated in said chamber upon burning of said grain constant regardless of grain temperature changes.

7. A solid propellant reaction motor comprising a hollow casing formed with a fluid jet exhaust nozzle at one end and containing a solid propellant grain spaced from said nozzle to define a combustion chamber between, said grain burning regressively from its surface exposed to the combustion chamber and in a direction perpendicular to the burn surface generating a gas under pressure in said chamber, the initial burn rate of said grain and the chamber pressure varying with changes in grain ambient temperature, and temperature sensitive burn area control means movable in response to grain temperature changes to compensate for said changes and produce an initial predetermined chamber gas pressure upon burning of said grain, said grain having a plurality of radially separated axially extending bores therein extending equal distances from the grain burn surface, an igniter means in each of said bores, said control means being connected to said grain and in one position rendering operable a selected group of said igniter means and being movable to other positions in response to grain ambient temperature changes to render operable different groups of said igniter means so that the burn area of said surface at ignition is determined by the position of said control means as determined by the ambient temperature of said grain at ignition.

References Cited in the file of this patent

UNITED STATES PATENTS

| | | |
|---|---|---|
| 2,096,619 | Prince | Oct. 19, 1937 |
| 2,932,162 | Malick | Apr. 12, 1960 |
| 2,952,208 | Wagoner | Sept. 13, 1960 |
| 2,956,401 | Kane | Oct. 18, 1960 |
| 3,041,835 | Henderson et al. | July 3, 1962 |